Nov. 9, 1971 G. MINK 3,618,352
CUTOFF TOOL AND METHOD
Filed May 19, 1969 2 Sheets-Sheet 1

INVENTOR.
George Mink
BY
Harness, Dickey & Pierce
ATTORNEYS.

United States Patent Office 3,618,352
Patented Nov. 9, 1971

3,618,352
CUTOFF TOOL AND METHOD
George Mink, 13130 Geoffrey, Warren, Mich. 48026
Filed May 19, 1969, Ser. No. 825,605
Int. Cl. B21d 3/02, 31/02
U.S. Cl. 72—71   8 Claims

ABSTRACT OF THE DISCLOSURE

An apparatus and method for cutting off and upsetting projections of one member for fixing such member to another member. The apparatus includes pairs of cutting heads that are rotatably supported and which are additionally pivotal for movement into engagement with the projections to be cut for cutting and upsetting such projections.

BACKGROUND OF THE INVENTION

This invention relates to a tool and method for cutting off and upsetting projections of a member and more particularly to such a tool and method for fixing the member to another member.

Riveting is one common method for connecting members together. The rivets used for this purpose may be separate pieces or may form projections of one of the members that pass through apertures in another member and which are upset for securing the members together. This latter method is commonly used for affixing many types of trim pieces to panels. Normally, the projections are longer than necessary and are first cutoff to the appropriate length and are subsequently upset by a suitable tool. This two step method is obviously expensive.

It is, therefore, a principal object of this invention to provide an improved tool and method for simultaneously cutting off and upsetting a projection.

It is another object of this invention to provide an improved tool and method for affixing two members together.

It is a still further object of this invention to provide an improved cutoff and upsetting tool.

SUMMARY OF THE INVENTION

A machine embodying this invention is particularly adapted for cutting and upsetting a projection of a first member for fixing the first member to a second member. Such a machine comprises cutting tool means, means for rotating the cutting tool means about an axis substantially parallel to the projection, means for supporting the cutting tool means for movement in a direction having at least a component of movement in a direction normal to the axis of rotation and means for moving the cutting tool means in the normal direction for feeding the cutting tool means into the projection to cutoff and upset the projection.

A method embodying this invention is particularly adapted for fixing two members together wherein one of the members is formed with a projection and the other member has an opening through which the projection is adapted to extend. This method comprises the steps of passing the projection through the opening and simultaneously cutting off and upsetting the projection with the amount of upset being sufficient to preclude reentry of the projection back through the opening whereby the members are fixed together.

BRIEF DESCRIPTION OF THE DRAWINGS

FIG. 2 is a cross-sectional view, taken along a plane corresponding to the plane along which FIG. 1 is taken, showing a pair of members adapted to be affixed together by the machine shown in FIG. 1 and before assembly.

DETAILED DESCRIPTION OF THE PREFERRED EMBODIMENT

Figure 1:
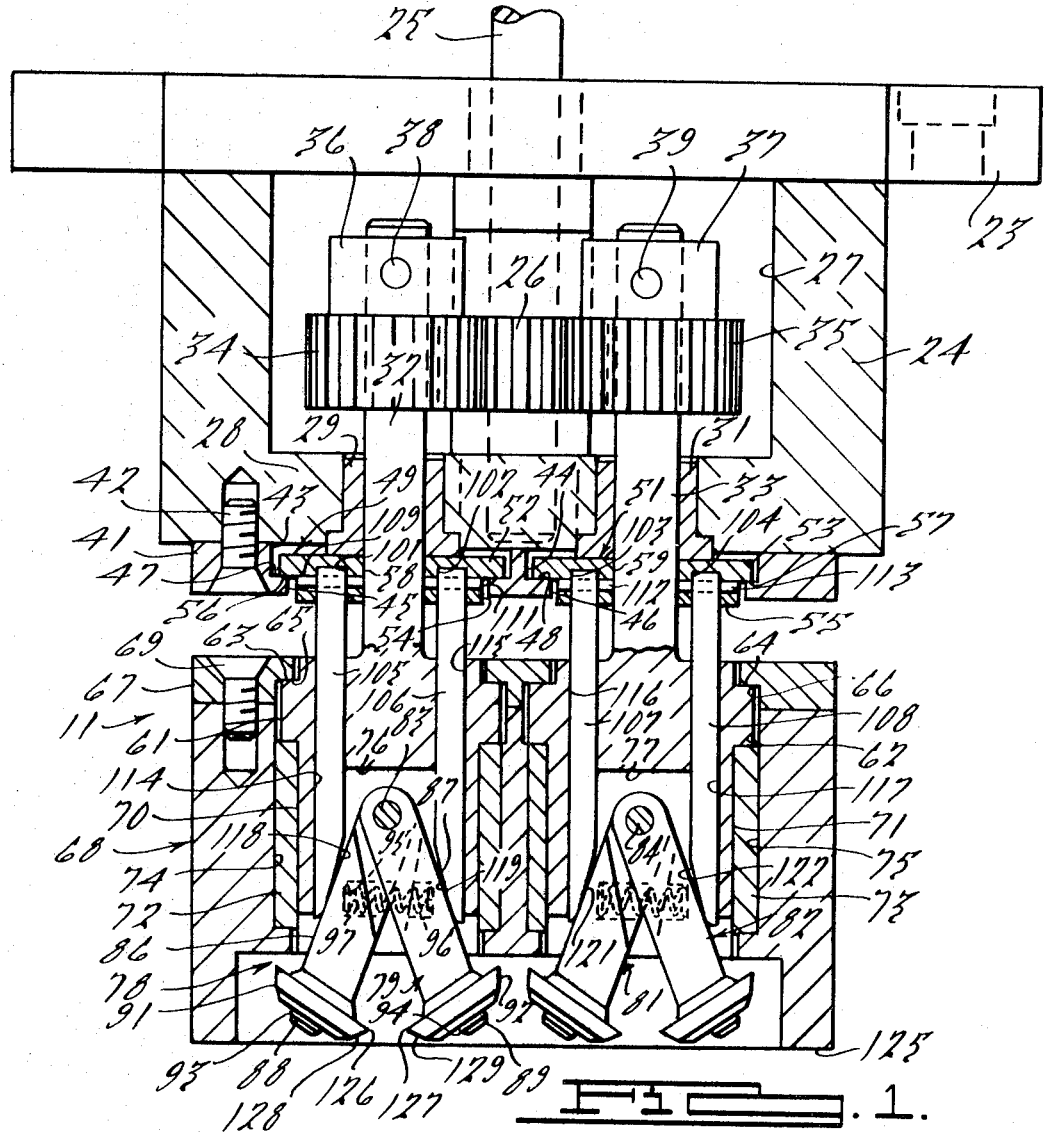
FIG. 1 is a cross-sectional view taken along a generally vertically extending plane and showing a cutoff machine embodying this invention in a retracted position.
Figure 2:
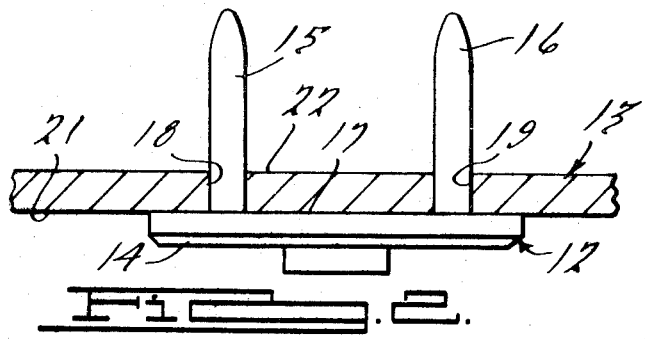
Figure 3:
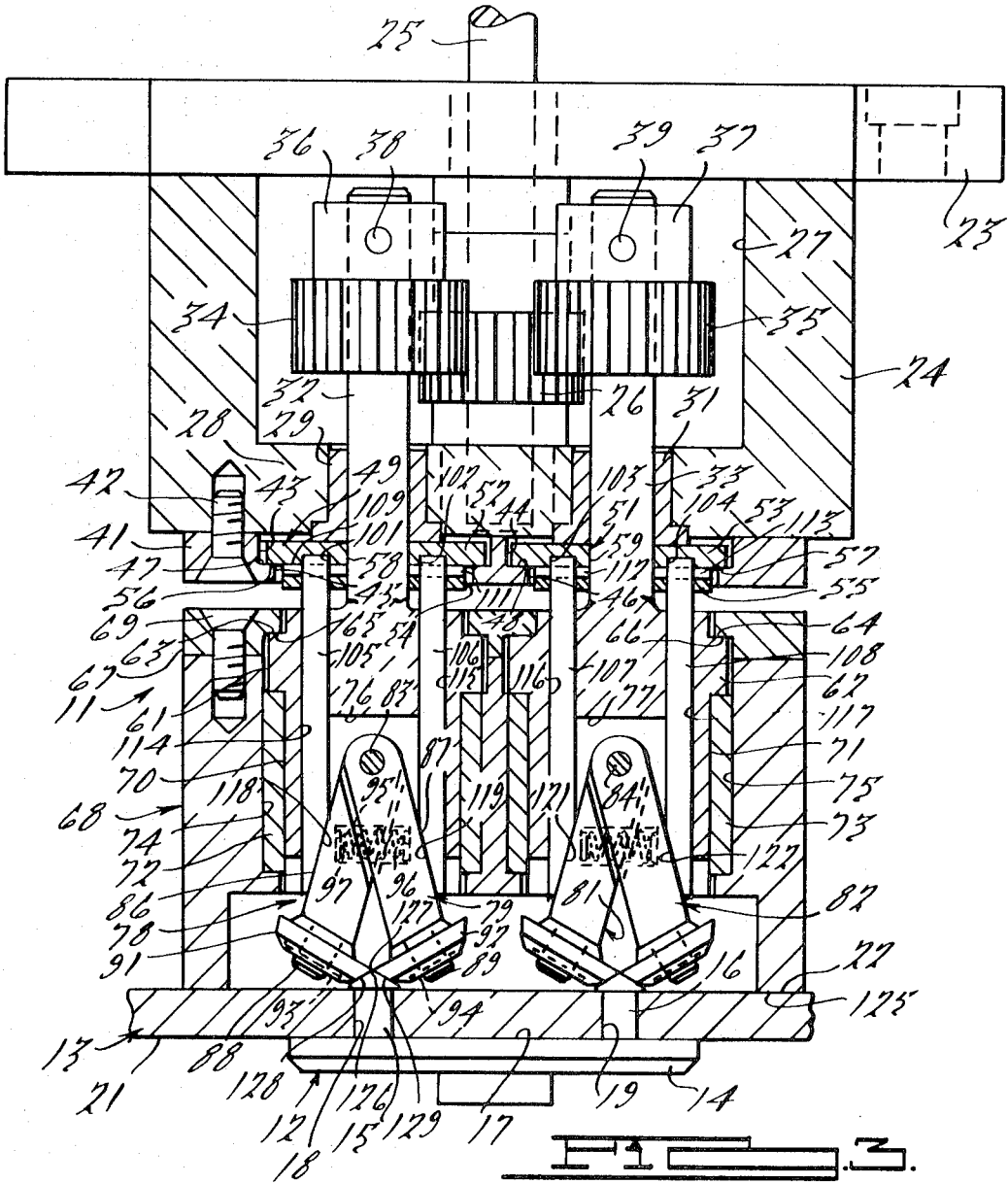
FIG. 3 is a cross-sectional view, in part similar to FIG. 1, showing the machine in its operative, cutoff position.

In FIGS. 1 and 3, a cutoff machine embodying this invention is identified generally by the reference numeral 11. The cutoff machine 11 is particularly adapted for affixing a pair of members, indicated generally by the reference numerals 12 and 13 (FIG. 2), together.

Referring first specifically to FIG. 2, the member 12 may comprise a trim piece while the member 13 comprises a panel to which the trim piece 12 is to be affixed. The trim piece 12 has an outer decorative face 14 and a pair of pin like projections 15 and 16 that extend outwardly from its rear face 17. A pair of openings or apertures 18 and 19 are formed in the panel 13 through which the projections 15 and 16 are adapted to extend. Prior to assembly, the projections 15 and 16 are extended through the apertures 18 and 19 until the rear face 17 of the trim piece 12 engages the adjacent face 21 of the panel 13. In this condition, the projections 15 and 16 extend a substantial distance away from the rear face 22 of the panel 13. The machine 11 is adapted to cut off and upset the projections 15 and 16 (FIG. 3) for affixing the trim piece 12 to the panel 13.

Considering now in detail FIGS. 1 and 2, the cutoff machine 11 includes a head assembly consisting of a plate 23 and depending housing 24. The plate 23 and housing 24 journal a driving shaft 25 in any appropriate manner and which driving shaft carries a driving gear 26. The gear 26 is disposed within a cavity 27 formed by the housing 24 and which is closed at its upper end by the plate 23. The head assembly is adapted to be affixed to any suitable machine tool (not shown), which machine tool is adapted to drive the driving shaft 25 and to support the plate 23 and housing 24 for reciprocation, as will become more apparent as this description proceeds.

The housing 24 has an integral lower wall 28 in which bushings 29 and 31 are supported. Each of the bushings 29 and 31 rotatably and reciprocally supports respective driven shafts 32 and 33. Driven gears 34 and 35 have extensions 36 and 37 that are keyed, as by pins 38 and 39, respectively, to the driven shafts 32 and 33. The driven shafts 32 and 33 are supported for reciprocal movement between two extreme positions, as will become more apparent as this description proceeds, and in each of these positions the driven gears 34 and 35 remain in mesh with the driving gear 26.

A plate 41 is affixed to the lower surface of the housing wall 28, as by screws 42 (only one of which appears in the drawings). The plate 41 defines two parallel counterbores that consist of larger diameter portions 43 and 44 and smaller diameter portions 45 and 46. Shoulders 47 and 48 are formed between the portions 43, 45 and 44, 46. Cam holding members 49 and 51 are received in the respective counterbores and have enlarged portions 52 and 53 that are received in the counterbore portions 43 and 44, respectively, and smaller diameter portions 54 and 55 that depend through the counterbore portions 45 and 46. Downwardly facing shoulders 56 and 57 formed between the portions 52, 54 and 53, 55, respectively, are adapted to engage the plate shoulders 47 and 48. The cam holding members 49 and 51 are bored, as at 58 and 59, to pass the driven shafts 32 and 33, respectively.

The lower ends of the driven shafts 32 and 33 are formed with enlarged portions 61 and 62, respectively. These enlarged portions have upwardly facing shoulders 63 and 64 that are engaged by shoulders 65 and 66 that are formed by counterbored portions of a plate 67. The plate 67 is affixed to a housing member 68 by screws 69, only one of which appears in the drawings. Adjacent the enlarged portions 61 and 62, the driven shafts 32 and 33 are formed with generally cylindrical portions 70 and 71 that are journaled in bushings 72 and 73 received in counterbores 74 and 75 of the housing 68. The cylindrical portions 70 and 71 are formed with recesses 76 and 77 in which pairs of pivotally supported cutting and upsetting tools 78, 79 and 81, 82 are received. As will become more apparent as this description proceeds, the cutting tools 78, 79 and 81, 82 are pivotally supported upon pivot pins 83 and 84 that are fixed to the driven shaft cylindrical portions 79 and 71 within the recesses 76 and 77.

The cutting tools 78 and 79 have shank portions 86 and 87, respectively, with integral shaft portions 88 and 89 formed at their lower ends. Cutting members 91 and 92 are supported upon the shaft portions 88 and 89 for rotation and are held in place axially by means of snap rings 93 and 94. Pockets 95 and 96 are formed in the shank portions 86 and 87 and receive a coil spring 97 for urging the shank portions 86 and 87 away from each other about the pivot pin 83. The construction of the tools 81 and 82 is identical to the construction of the cutting tools 78 and 79 and a detailed description of this construction will not be repeated.

The cam holding members 49 and 51 are formed with pairs of bored openings 101, 102 and 103, 104 that extend parallel to the axis of the driven shafts 31 and 32. Cam pins 105, 106, 107, 108 are received in the openings 101 through 104, respectively, and are held in place by pins 109, 111, 112 and 113. The cam pins 105 and 106 also extend through bored openings 114 and 115 formed in the driven shaft 32, which openings extend from the enlarged portion 61 into the cylindrical portion 70 on opposite sides of the cavity 76. The cam pins 107 and 108 likewise depend through bored openings 116 and 117 formed in the lower end of the driven shaft 33. The lower ends of the cam pins 105, 106, 107 and 108 are offset, as at 118, 119, 121 and 122, respectively. These surfaces engage the outer ends of the cutting tools 78, 79, 81 and 82 for limiting the degree of their pivotal movement away from each other about the pivot pins 83 and 84.

OPERATION

In order to attach the trim piece 12 to the panel 13, the projections 15 and 16 are inserted through the apertures 18 and 19 so that these members are in the position shown in FIG. 2. The thus completed subassembly is then presented to the machine 11 which is in a retracted position as shown in FIG. 1.

In the retracted position, the housing 68 falls away from the housing 24 carrying the driven shafts 32 and 33 with it. In this condition, the driven gears 34 and 35 mesh with the lower portion of the driving gear 26 and the driving relationship between the driving shaft 25 and driven shafts 32 and 33 is not interrupted. The springs 97 will urge the cutting tools 78, 79 and 81, 82 away from each other. The cutters 91 and 92 carried by each of these cutting tools are spaced apart a distance greater than the diameter of the projections 15 and 16 so that the members 12 and 13 may be positioned beneath and between these cutting edges.

The associated machine that carries the cutoff machine 11 is then actuated to bring the plate 23 and related mechanism downwardly toward the members 12 and 13. This downward movement continues until the lower face 125 of the housing 67 engages the rear face 22 of the panel 13. When this occurs, the housing 24 moves downwardly relative to the housing 68. The cam pins 105, 106, 107 and 108 them move downwardly while continuing their rotation along with the driven shafts 32 and 33. The camming surfaces 118, 119, 121 and 122 then force the cutting tools 78, 79 and 81, 82 toward each other. It should be remembered that these cutting tools are rotating along with the respective driven shafts 32 and 33 at this time. As the cutters 91 and 92 approach each other, these cutting edges 126 and 127 engage the respective projections 15 and 16 and commence to deform and cutoff these projections. The cutting tools are beveled, as at 128 and 129, adjacent the cutting edges 126 and 127 causing a certain amount of the material to be upset as well as cutoff. Downward movement continues until the cutting edges 126 and 127 engage each other at which point the upper ends of the projections 15 and 16 will be cutoff. As shown in FIG. 3, the projections are upset in this position into engagement with a rear face 22 of the panel 13 to preclude reentry through the apertures 18 and 19 thus securing the trim piece 12 to the panel 13. The machine 11 is then retracted.

What is claimed is:

1. A machine for cutting and upsetting a projection of a first member for affixing the first member to a second member comprising cutting tool means, drive means for rotating said cutting tool means about an axis substantially parallel to the projection, means for supporting said cutting tool means for movement in a direction having at least a component of movement in a direction normal to said axis of rotation, and feed means for moving said cutting tool means in the last named direction during rotation of said cutting tool means for feeding said cutting tool means into the projection for progressively cutting off and upsetting the projection.

2. A machine as set forth in claim 1 wherein the means for supporting the cutting tool means for movement in the direction having a component normal to the axis of rotation pivotally supports the cutting tool means.

3. A machine as set forth in claim 1 further including means for supporting the cutting tool means for movement in a direction parallel to its axis of rotation.

4. A machine as set forth in claim 3 wherein the means for moving the cutting tool means in the direction having a component normal to the axis of rotation is responsive to engagement with a fixed stop for feeding said cutting tool means into the projection upon engagement with said fixed stop.

5. A machine as set forth in claim 4 wherein the means for supporting the cutting tool means for movement in the direction having a component normal to the axis of rotation pivotally supports the cutting tool means.

6. A machine as set forth in claim 2 wherein the drive means comprises an elongated shaft having a cavity formed at one end thereof, the cutting tool means being pivotally supported within said cavity, the feed means comprising a cam pin slidably supported by said shaft and having a portion extending into said cavity and engaged with said cutting tool means for pivoting said cutting tool means upon sliding movement of said cam pin.

7. A machine as set forth in claim 6 wherein there are a pair of cutting tool means and cam pins supported within said cavity.

8. A machine as set forth in claim 6 further including means for reciprocating the shaft along its axis of rotation between a first and a second position, the feed means further comprising means for sliding the cam pin relative to said shaft when said shaft is in its second position.

References Cited

UNITED STATES PATENTS

| | | | |
|---|---|---|---|
| 359,758 | 3/1887 | Wicks | 72—121 |
| 2,185,337 | 1/1940 | Greer | 72—71 |
| 3,090,263 | 5/1963 | Laverty | 72—71 |

CHARLES W. LANHAM, Primary Examiner

R. M. ROGERS, Assistant Examiner

U.S. Cl. X.R.

72—325, 121